United States Patent [19]

Waterman

[11] Patent Number: 4,883,281
[45] Date of Patent: Nov. 28, 1989

[54] ELASTOMERIC VERTICAL CORNER BUMPER FOR SHOPPING CART

[75] Inventor: Dewey J. Waterman, Ceresco, Mich.

[73] Assignee: United Steel & Wire Company, Battle Creek, Mich.

[21] Appl. No.: 338,542

[22] Filed: Apr. 14, 1989

Related U.S. Application Data

[63] Continuation of Ser. No. 270,362, Nov. 14, 1988, abandoned.

[51] Int. Cl.$^4$ .............................................. B62B 3/00
[52] U.S. Cl. ............................ 280/33.992; 248/345.1; 293/117; 293/123
[58] Field of Search ...................... 248/345.1; 211/183; 280/33.991, 33.992, 33.997; 293/1, 38, 117, 123

[56] References Cited

U.S. PATENT DOCUMENTS

| | | | |
|---|---|---|---|
| 2,685,147 | 8/1954 | Burr | 248/345.1 |
| 3,503,622 | 3/1970 | Romero | 280/33.99 F |
| 4,012,878 | 3/1977 | Ellingson | 248/345.1 X |
| 4,600,204 | 7/1986 | Badger | 280/33.99 A |

OTHER PUBLICATIONS

Drawing No. 1-1295-515 United Steel & Wire Division 6/8/76.

Kart—Gard Publication, Carriage Trade Service Company Photographs (2).

Primary Examiner—Charles A. Marmor
Assistant Examiner—Michael Mar
Attorney, Agent, or Firm—Flynn, Thiel, Boutell & Tanis

[57] ABSTRACT

A bumper for a shopping cart basket is molded of an elastomeric plastics material which is relatively soft and provides the bumper with desirable cushioning effect. The bumper is sized to extend substantially the full vertical extent of the basket front corner. The bumper has rounded convex and concave outer and inner surfaces respectively to provide a smooth outer configuration and a smooth inner configuration which snugly mounts against the cart basket. The bumper has pairs of vertically-spaced inwardly projecting mounting flanges integrally molded thereon and provided adjacent the upper and lower ends thereof, which pairs respectively straddle one of the uppermost and lowermost horizontal basket wires. The bumper also has one or more intermediate mounting flanges which also project inwardly for vertical disposition between the upper and lower pairs. A mounting rod is positioned inside of the horizontal basket wires and is slidably inserted through aligned openings formed in the mounting flanges to fixedly secure the bumper to the basket.

9 Claims, 2 Drawing Sheets

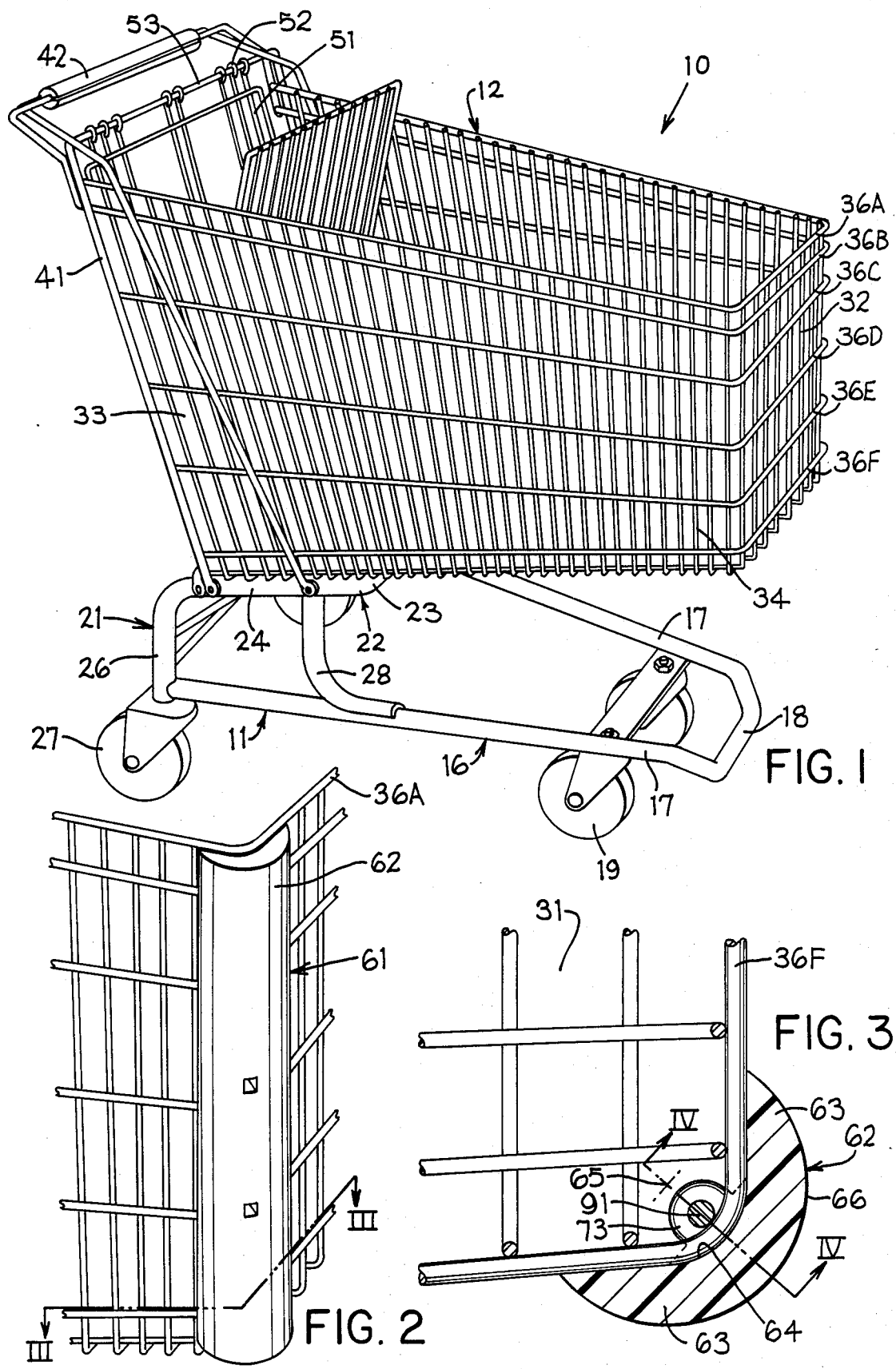

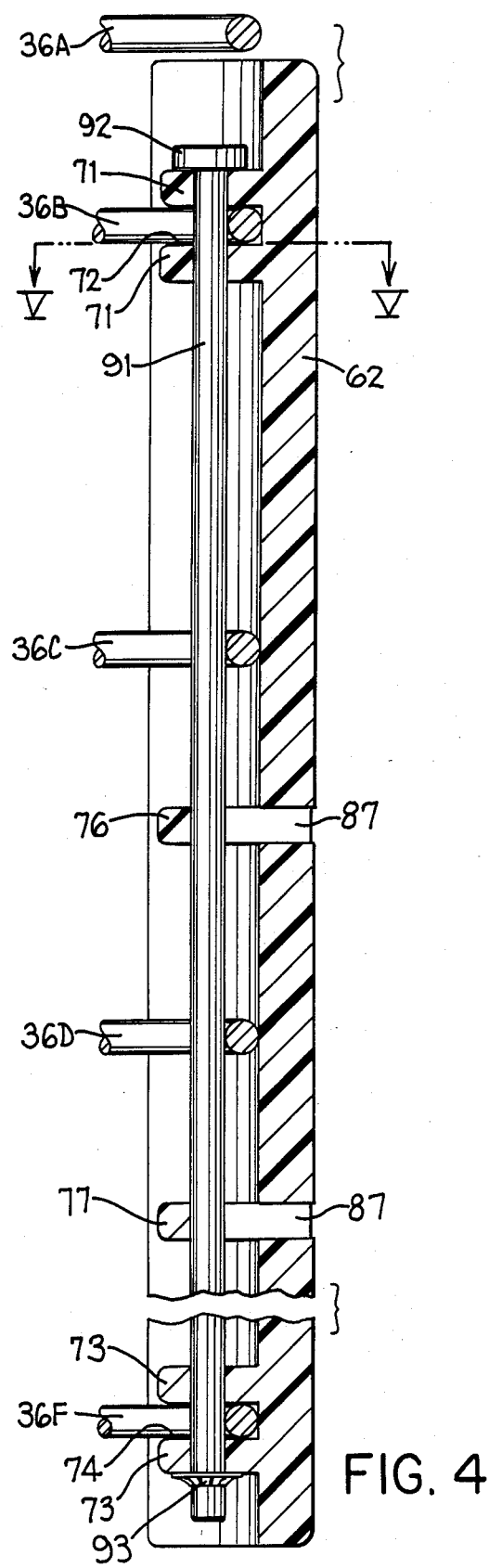
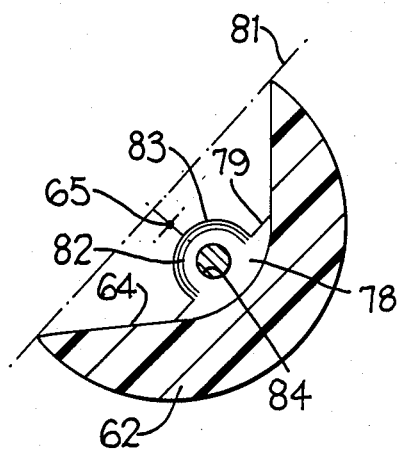
FIG. 4
FIG. 5

ELASTOMERIC VERTICAL CORNER BUMPER FOR SHOPPING CART

This application is a continuation of U.S. Ser. No. 07/270 362, filed Nov. 14, 1988 now abandoned.

FIELD OF THE INVENTION

This invention relates to a shopping cart of the type having a goods-receiving basket formed from a plurality of horizontally and vertically extending wires which intersect and are suitably rigidly joined together and, in particular, to an improved protective bumper which can be mounted on the front corners of the basket.

BACKGROUND OF THE INVENTION

U.S. Pat. No. 4,600,204, as owned by the Assignee of this application, illustrates two variations of a vertical corner bumper which mounts on the front corners of a wire shopping cart basket so as to extend over a majority of the vertical extent of the corners. In one variation, the bumper is extruded of plastic and utilizes a complex wire member having multiple bends therein and hooks at the upper and lower ends for attaching the bumper to the basket corner. In the other variation, the bumper is molded of plastic and has an inner remote hook at the lower end, and a bent wire hook at the upper end for attaching the bumper to the basket. While the bumpers disclosed in the aforesaid patent are desirable from the standpoint of the protective feature which they provide, nevertheless they have been observed to also possess features which are less than optimum. For example, the plastic forming the bumpers is generally considered too hard to perform an effective cushioning function, particularly when the bumper is extruded since material suitable for extrusions of this type generally do not possess the desired cushioning effect. Further, the overall structure of the bumper and specifically the manner in which it is attached to the cart is undesirably costly and complex.

Accordingly, it is an object of this invention to provide an improved bumper which extends the full extent of the front corners of the basket, but which bumper improves upon and overcomes disadvantages associated with the prior bumpers as described above.

SUMMARY OF THE INVENTION

In the improved cart bumper of this invention, the bumper is molded of an elastomeric plastics material which is relatively soft and provides the bumper with desirable cushioning effect, and at the same time the bumper is sized so as to extend substantially the full vertical extent of the cart basket front corner. The bumper has rounded convex and concave outer and inner surfaces, respectively, thereby providing both a smooth outer configuration and a smooth inner configuration which snugly mounts against the cart basket. The bumper has pairs of vertically-spaced inwardly projecting mounting flanges integrally molded thereon and provided adjacent the upper and lower ends thereof, which pairs respectively straddle one of the uppermost and lowermost horizontal basket wires. The bumper also has one or more intermediate mounting flanges which also project inwardly for vertical disposition between the upper and lower pairs. A mounting rod which is positioned inside of the horizontal basket wires is slidably inserted through aligned openings formed in the mounting flanges to fixedly secure the bumper to the basket.

Other objects and purposes of the invention will be apparent to persons familiar with structures of this type upon reading the following specification and inspecting the accompanying drawings.

BRIEF DESCRIPTION OF THE DRAWINGS

FIG. 1 is a prospective view of a conventional shopping cart of the type having a basket which nests within a basket of a similar such cart.

FIG. 2 is a fragmentary prospective view illustrating the front corner of the cart basket with a bumper according to this invention mounted thereon.

FIG. 3 is a sectional view taken substantially along line III—III in FIG. 2.

FIG. 4 is a sectional view taken substantially along line IV—IV in FIG. 3.

FIG. 5 is a sectional view along line V—V in FIG. 4.

Certain terminology will be used in the following description for convenience in reference only, and will not be limiting. For example, the words "upwardly", "downwardly", "rightwardly" and "leftwardly" will refer to directions in the drawings to which reference is made. The word "forward" and "rearward" will refer to opposite ends of the cart as respectively appearing on the right and left sides of FIG. 1. The words "inwardly" and "outwardly" will refer to directions toward and away from, respectively, the geometric center of the cart and designated parts thereof. Said terminology will include the words specifically mentioned, derivatives thereof, and words of similar import.

DETAILED DESCRIPTION

FIG. 1 illustrates therein a shopping cart 10 which includes a wheeled base 11 supporting an upwardly opening basket 12 thereon.

The base 11 includes a U-shaped bottom frame rail 16 which defines a pair of converging side rails 17 having an integral front rail or bight portion 18 at the forward end thereof. A pair of conventional casters 19 are supported under the front end of the base rail. The rearward ends of the side rails 17 are fixedly joined, as by welding, to a further U-shaped frame member 21 which includes a U-shaped basket-supporting portion 22 which is spaced upwardly from the base rail 16 in approximately parallel relationship therewith. This basket-supporting portion 22 includes a front leg or cross rail 23 which extends across beneath the basket and terminates in side rails 24 which project rearwardly toward the rear of the basket and then bend downwardly to define rear legs 26 which, at their lower ends, have rollers 27 mounted thereon. Suitable reinforcing braces 28 extend between and are fixedly connected to the vertically-spaced rails 17 and 24.

The base 11 is of a generally tapered or converging configuration as it projects forwardly from the rear end thereof to permit the base of one cart to partially nest within the base of the next forwardmost cart to facilitate storage of like carts.

The construction of the base 11, as briefly described above, is conventional so that further detailed description thereof is believed unnecessary.

The basket 12, in the illustrated and preferred embodiment, is constructed of wire rod. The basket includes a bottom wall 31, an upright front wall 32, and a pair of opposed side walls 33, which walls are all integrally and rigidly joined together. These walls are all formed from a plurality of intersecting metal wires or rods, such as the vertical rods 34, which are suitably welded together at their intersection points to define a gridlike structure. The front and side walls include a plurality of substantially horizontal rod elements 36 which are U-shaped and extend across the front wall and longitudinally rearwardly of the side walls, at least one of these rods 36A defining the upper edge of the basket. The bottom wall 31, which is supported on the basket support 22, is slightly upwardly sloped as it projects forwardly. The opposed side walls 33 also have a slight converging relationship therebetween as they project forwardly. These relationships permit the baskets of like carts to nest one within the other during storage.

The rear vertical edges of the side walls 33 are defined by upright rods or posts 41 which have their lower ends fixedly secured to the base, as to the side legs 24 of the basket support. The upper ends of these posts 41 project upwardly above the upper edge of the basket side walls, and a horizontally extending rodlike handle 42 is fixed to and extends between the upper ends of these posts 41.

The rear of basket 12 is closed by means of an end or rear gate 51, this gate also being formed from a plurality of intersecting wire rods which form a gridlike structure. The gate 51 includes hook portions 52 at the upper edge thereof, which hook portions hingedly support the gate on the top cross rod 53. This enables the gate to vertically swing inwardly of the basket in a conventional manner to permit nesting of like carts.

According to the present invention, as illustrated by FIGS. 2-4, there is provided an improved bumper arrangement 61. A pair of identical such bumper arrangements are adapted to be mounted on the front corners of the basket 12.

This bumper arrangement 61 includes a vertically elongated striplike bumper 62 which is preferably formed of a plastics material, such as by being molded. This bumper 62 is substantially L-shaped in horizontal cross section and includes a pair of short and substantially identical leg portions 63 which project outwardly in approximately perpendicular relationship from a common rounded integral corner. This bumper 62 has a rounded concave inner surface 64 for abuttingly contacting the horizontal wires 36, which inner surface includes a smooth and substantially uninterrupted inner surface extending vertically along each of the leg portions 63 adjacent the free ends thereof. The bumper 62 also has an outer surface 66 which is rounded, being generated about the center point 65 so as to be of a partial circular profile. The bumper 62 extends through an angular extent of about 180°. as generated about the center point 65, and hence is generally of a semi-annular configuration.

The bumper 62 also has a plurality of mounting flanges which are fixedly and integrally molded thereon and project outwardly from the inner surface 64. More specifically, the bumper 62 includes a cooperating pair of upper flanges 71 which are dispose adjacent the upper end of the bumper and are vertically aligned directly one over the other but are slightly vertically spaced to define a narrow slot 72 therebetween. This slot 72 opens horizontally inwardly away from the bumper and has a vertical width which substantially equals or only slightly exceeds the diameter of the horizontal basket wires 36. The uppermost flange 71 is spaced downwardly a small distance, such as in the order of about three-eights to three-fourths inch, from the upper end of the bumper strip 62.

A further pair of lower mounting flanges 73 are provided adjacent the lower end of the bumper strip 62 and project horizontally outwardly from the inner surface 64 thereof, whereby these flanges 73 are hence vertically aligned directly below the upper flanges 71. This pair of lower flanges 73 are disposed closely vertically adjacent one another but are vertically spaced apart by a narrow horizontal slot 74 which is identical to the slot 72 so as to closely accommodate one of the horizontal basket wires 36 therein. The lowermost one of the flanges 73 is disposed closely adjacent but spaced slightly upwardly from the lower end of the strip 62, this spacing being in the order of about three-eights to about three-fourths inch.

The bumper strip 62 also has two additional intermediate mounting flanges 76 and 77 integrally molded thereon and projecting inwardly from the inner surface thereof. These intermediate mounting flanges 76 and 77 are disposed vertically in alignment between the upper flanges 71 and the lower flanges 72, and the intermediate flanges 76 and 77 are themselves vertically spaced a substantial distance from one another and from the upper and lower flanges 71 and 73, respectively.

Each of the flanges 71, 73, 76 and 77 has generally the same configuration and specifically includes a platelike rib part 78 which projects horizontally outwardly away from the inner surface 64 through a selected extent so as to terminate in a rear edge 79 which is spaced inwardly a substantial distance from the plane 81 which defines the free vertical edges of the bumper, which plane 81 also substantially contains therein the center 65 of the outer surface. Each of these flanges also includes a hub portion 82 which is integral with the rib part 78 and projects outwardly beyond the surface 79. This hub part 82 extends generally along the central longitudinally-extending vertical plane of the bumper, and projects outwardly through a distance so as to terminate substantially at or closely adjacent the diametrical vertical plane 81. This hub part preferably has a rounded exterior surface 83 which approximates a semi-cylindrical surface to eliminate sharp corners.

The upper flanges 71 have aligned circular holes 84 extending vertically therethrough, and the lower flanges 73 also have similar circular holes extending vertically therethrough, so as to be vertically aligned. The vertical axis of these holes is defined between the inner surface of the bumper and the diametrical plane 81, and is disposed generally within the longitudinally-extending central vertical plane of the bumper.

The intermediate flanges 76 and 77 also each have an opening 87 extending vertically therethrough generally in vertical alignment with the openings 84. While this opening 87 could be a circular hole, in the illustrated embodiment it comprises an elongate slot which projects horizontally through the rib and through the bumper, with the rearward or inner end of the slot being closed by the respective hub part.

The flanges are adapted to receive an elongate securing rod 91 for attaching the bumper to the cart basket. This rod 91 is normally of metal and is of circular-cross section sized so as to be snugly accommodated within the openings 84. The rod 91 has a vertical length which is only slightly less than the overall vertical length of the bumper strip 62. The rod hence can be inserted through all of the mounting flanges so that opposite end parts of the rod project outwardly a small distance both above the uppermost flange 71 and below the lowermost flange 73.

The rod 91 preferably has an enlarged head or flange 92 formed integrally on the upper end thereof so as to abut the uppermost flange 71 to securely position the rod 91 relative to the bumper strip. A resiliently deformable securing washer 93 is preferably mounted on the lower end of the rod for abutment with the underside of the lowermost flange 73.

To secure the bumper 62 to the front corner of the basket 11, the bumper 62 is oriented adjacent the basket corner and moved inwardly so that the second uppermost horizontal rod 36B projects into the slot 72 between the upper mounting flanges 71, and simultaneously the lowermost horizontal basket wire 36F projects into the slot 74 between the lower pair of mounting flanges 73, the wires substantially abutting or conforming with the inner surface 64 of the plastic bumper strip 62. This positioning of the bumper strip results in the intermediate mounting flange 76 being inserted into the cart interior in vertically-spaced relationship somewhere between the horizontal rods 36C and 36D, and similarly the other intermediate mounting flange 77 is inserted vertically somewhere intermediate the horizontal wire rods 36D and 36E. With the bumper strip so positioned, then the rod 91 is slidably inserted downwardly through all of the aligned openings formed in the mounting flanges, substantially as illustrated by FIG. 4, thereby securely fixing the bumper strip to the basket corner. The rod 91 is slidably inserted downwardly until the head end of the rod abuts the upper flange 71 and securely retain the rod 91 in position. While not absolutely required, the locking clip 93 is preferably slidably inserted over the lower end of the rod to abut the underside of the lower flange 73 to positively retain the rod and bumper strip in position on the cart, and prevent or greatly restrict unauthorized removal of the bumper strip.

When so assembled, the bumper strip extends substantially the full vertical length of the basket corners so as to optimize the protection afforded y the bumper. That is, the upper end of the bumper strip is disposed closely adjacent and generally only slightly below the top horizontal rod 36A, and the lower end of the bumper strip projects slightly below the lower horizontal rod 36F to hence be disposed in the vicinity of the bottom wall of the basket.

The bumper strip is preferably molded from a relatively soft plastics material, such as medical grade polyvinyl chloride, having a durometer such that the bumper strip possesses at least limited surface deformability for cushioning purposes, but at the same time has elastomeric memory or restorability so as to substantially reassume its original shape when the impact force is removed. For this purpose, the plastics material preferably has a durometer in the range of about 65 to about 75.

Further, the plastics material preferably incorporates therein a phosphorescent pigment which significantly improves the visibility and reflectability of the material, particularly so as to improve the visibility of the cart when same is located in a parking lot at night since vehicle headlights will thus more readily reflect from the fluorescent bumpers.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart having a wheeled base and an upwardly opening basket mounted on said base in upwardly spaced relationship therefrom, said basket including a front wall which extends between and rigidly joins to a pair of sidewalls and to a bottom wall, said front wall where it joins to the side walls defining a pair of front corners, said front and side walls being of a meshlike construction formed from a plurality of transversely extending rods which intersect and are joined together, said plurality of rods including a plurality of substantially horizontally extending rods which are vertically spaced apart, said plurality of horizontally extending rods including a first rod which defines the upper edge of the side and front walls and a second rod which is generally parallel to the first rod but spaced downwardly therefrom by a small vertical extent, said plurality of substantially horizontal rods including a third rod which extends along the side and front walls and is the lowermost one of said plurality and is spaced upwardly only a small distance above said bottom wall, said plurality of horizontal rods also including fourth and fifth rods which are vertically spaced from one another and are vertically spaced between said second and third rods, and a bumper arrangement attached to said basket in the vicinity of each said front corner, the improvement wherein said bumper arrangement comprises:

a vertically elongated striplike bumper formed of a plastics materials having limited elasticity for permitting elastic deformation due to impacts thereagainst, said bumper being positioned closely adjacent the exterior side of said front corner and extending along substantially the full vertical extent of said corner;

said bumper having a substantially L-shaped cross section defined by a pair of approximately perpendicularly extending leg parts joined by a curved corner part, said bumper having an inner surface which is adapted to abuttingly engage the horizontal rods defining said basket in the vicinity of said front corner, said inner surface having a configuration which closely corresponds to the configuration of said corner so that said bumper closely conforms to said front corner;

said bumper having a plurality of mounting flanges integrally molded therewith and projecting outwardly from said inner surface in generally perpendicular relationship thereto, said plurality of mounting flanges being disposed in generally vertically aligned but vertically-spaced relationship along said inner surface, each said mounting flange being defined by a platelike rib which projects outwardly from the inner surface in the vicinity of the curved part with said rib being integrally joined to and extending between said leg parts, each said mounting flange having an opening extending vertically therethrough substantially in alignment with similar openings formed in the other mounting flanges;

said plurality of mounting flanges including a pair of upper mounting flanges which are vertically spaced apart by a slot which opens horizontally, said slot having a vertical width which approximately equals the diameter of said second rod for accommodating said second rod therein, the uppermost one of said pair of upper mounting flanges being disposed closely adjacent but spaced downwardly a small distance from the upper end of said striplike bumper;

said plurality of mounting flanges including a pair of lower mounting flanges which are vertically spaced apart by a slot which opens horizontally and has a vertical height which approximately equals the diameter of said third rod for accommodating said third rod therein, the lowermost one of said lower mounting flanges being disposed closely adjacent the lower end of said striplike bumper; and a vertically elongate rod projecting through the aligned openings in said mounting flanges for confining rounded corners of said horizontal rods between said elongate mounting rod and the inner surface of said bumper, said elongate rod having upper and lower ends which respectively project upwardly beyond and downwardly below the respective uppermost upper mounting flange and the lowermost lower mounting flange, and means fixedly associated with the projecting upper end of said mounting rod for engaging the uppermost upper mounting flange to retain the mounting rod in position.

2. A cart according to claim 1, wherein said striplike bumper is molded of polyvinyl chloride having a durometer in the range of about 65 to about 75.

3. A cart according to claim 2, wherein said plurality of mounting flanges includes first and second intermediate mounting flanges which are vertically spaced a substantial distance from one another and are disposed vertically between and substantially vertically spaced from said upper and lower mounting flanges, each of said intermediate mounting flanges being disposed to project horizontally between a vertically-spaced pair of adjacent horizontal rods.

4. A cart according to claim 3, wherein said upper and lower mounting flanges have generally circular cross section openings extending vertically therethrough for snugly accommodating said mounting rod, and wherein said intermediate mounting flanges have openings extending therethrough which are transversely elongated and open outwardly through said bumper.

5. A cart according to claim 3, wherein said mounting flanges are confined substantially within a space defined by said inner surface and an imaginary vertical plane which extends between the free vertically-extending edges of said leg parts.

6. In a shopping cart having a wheeled base and an upwardly opening basket mounted on said base in upwardly spaced relationship therefrom, said basket including a front wall which extends between and rigidly joins to a pair of sidewalls and to a bottom wall, said front wall where it joins to the side walls defining a pair of front corners, said front and side walls being of a meshlike construction formed from a plurality of transversely extending rods which intersect and are joined together, said plurality of rods including a plurality of substantially horizontally extending rods which are vertically spaced apart, said plurality of horizontally extending rods including a first rod which defines the upper edge of the side and front walls and a second rod which is generally parallel to the first rod but spaced downwardly therefrom by a small vertical extent, said plurality of substantially horizontal rods including a third rod which extends along the side and front walls and is spaced upwardly only a small distance above said bottom wall, said plurality of horizontal rods also including a fourth rod which is vertically spaced between said second and third rods, and a bumper arrangement attached to said basket in the vicinity of each said front corner, the improvement wherein said bumper arrangement comprises:

a vertically elongated striplike bumper formed of a plastics materials having limited elasticity for permitting elastic deformation due to impacts thereagainst, said bumper being positioned closely adjacent the exterior side of said front corner and extending along substantially the full vertical extent of said corner;

said bumper having a substantially L-shaped cross section defined by a pair of approximately perpendicularly extending leg parts joined by a curved corner part, said bumper having an inner surface which is adapted to abuttingly engage the horizontal rods defining said basket in the vicinity of said front corner, said inner surface having a configuration so that said bumper closely conforms to said front corner;

said bumper having a plurality of mounting flanges integrally molded therewith and projecting outwardly from said inner surface in generally perpendicular relationship thereto, said plurality of mounting flanges being disposed in generally vertically aligned but vertically-spaced relationship along said inner surface, each said mounting flange being defined by a platelike rib which projects outwardly from the inner surface in the vicinity of the curved corner part with said rib being integrally joined to and extending between said leg parts, each said mounting flange having an opening extending vertically therethrough substantially in alignment with similar openings formed in the other mounting flanges;

said plurality of mounting flanges including a pair of upper mounting flanges which are vertically spaced apart by a slot which opens horizontally, said slot having a vertical width which approximately equals the diameter of said second rod for accommodating said second rod therein, the uppermost one of said pair of upper mounting flanges being disposed closely adjacent the upper end of said striplike bumper;

said plurality of mounting flanges including a pair of lower mounting flanges which are vertically spaced apart by a slot which opens horizontally and has a vertical height which approximately equals the diameter of said third rod for accommodating said third rod therein, the lowermost one of said lower mounting flanges being disposed closely adjacent the lower end of said striplike bumper; and vertically elongate rod means projecting through the aligned openings in said pair of upper mounting flanges and through the aligned openings in said pair of lower mounting flanges for confining rounded corners of said horizontal rods between said rod means and the inner surface of said bumper, and head means fixedly associated with an upper end of said rod means for engaging an uppermost mounting flange to retain the rod means in position.

7. A cart according to claim 6, wherein said plurality of mounting flanges includes first and second intermediate mounting flanges which are vertically spaced apart and are disposed vertically between and substantially vertically spaced from said upper and lower mounting flanges, each of said intermediate mounting flanges being disposed to project horizontally between a vertically-spaced pair of adjacent horizontal rods, said intermediate mounting flanges also having said openings extending vertically therethrough, and said rod means extending through the openings of said intermediate mounting flanges.

8. A cart according to claim 7, wherein said mounting flanges are confined substantially within a space defined by said inner surface and an imaginary vertical plane which extends between the free vertically-extending edges of said leg parts.

9. A cart according to claim 8, wherein said striplike bumper is molded of polyvinyl chloride having a durometer in the range of about 65 to about 75.

* * * * *

UNITED STATES PATENT AND TRADEMARK OFFICE
CERTIFICATE OF CORRECTION

PATENT NO. : 4,883,281

DATED : November 28, 1989

INVENTOR(S) : Dewey J. WATERMAN

It is certified that error appears in the above-identified patent and that said Letters Patent is hereby corrected as shown below:

Column 6, line 34; change "materials" to ---material---.

Column 7, line 40; after "adjacent" insert ---said---.

Column 7, lines 41-48; please delete in their entireties and replace with the following:

---4. A cart according to claim 3, wherein said openings in said upper and lower mounting flanges have a generally circular cross section for snugly accommodating said mounting rod, and wherein said openings in said intermediate mounting flanges are transversely elongated and open outwardly through said bumper.---

Column 8, line 12; change "materials" to ---material---.

UNITED STATES PATENT AND TRADEMARK OFFICE
CERTIFICATE OF CORRECTION

PATENT NO. : 4,883,281

DATED : November 28, 1989

INVENTOR(S) : Dewey J. Waterman

It is certified that error appears in the above-identified patent and that said Letters Patent is hereby corrected as shown below:

Column 9, line 10; after "adjacent" insert ---said--.

Signed and Sealed this

Sixteenth Day of October, 1990

Attest:

HARRY F. MANBECK, JR.

*Attesting Officer*  *Commissioner of Patents and Trademarks*